3,462,605
SEMICONDUCTOR LIGHT-EMITTER AND COMBINATION LIGHT-EMITTER-PHOTOCELL WHEREIN THE REFLECTOR OF THE LIGHT-EMITTER IS COMPRISED OF A MATERIAL DIFFERENT FROM THAT OF THE LIGHT-EMITTER
William E. Engeler, Scotia, N.Y., assignor to General Electric Company, a corporation of New York
Filed Sept. 22, 1965, Ser. No. 489,341
Int. Cl. H01j 39/12
U.S. Cl. 250—211          13 Claims

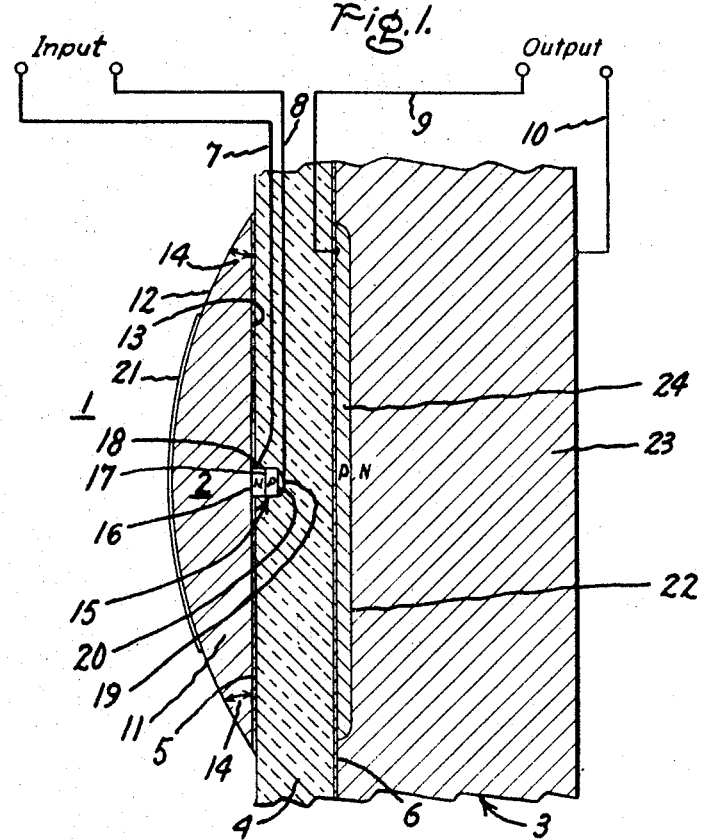
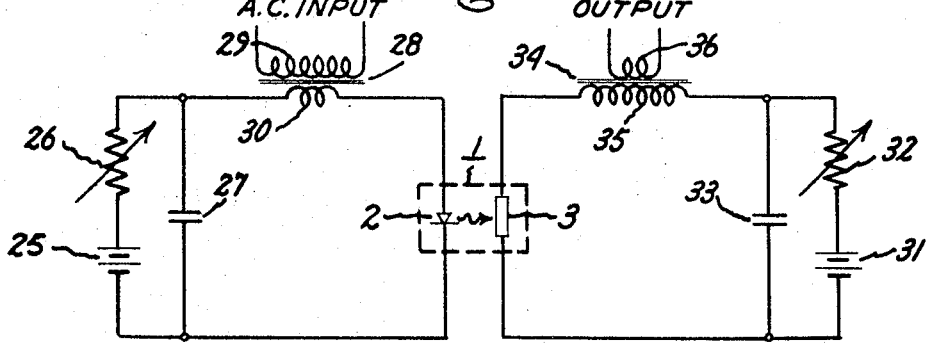

ABSTRACT OF THE DISCLOSURE

A unitary electro-optic device operable as a highly efficient isolation amplifier utilizes a semiconductive light source having a parabolic reflecting portion to produce parallel light rays directed toward a light detector portion thereof. Anti-reflecting coatings are included at interfaces between different materials of the device in order to improve operating efficiency.

---

The present invention relates to an improved electro-optic device and more particularly relates to a highly efficient semiconductive device for producing an output optically coupled to and electrically isolated from an input.

Previously known electro-optic devices such as those including an electroluminescent member and a photosensitive member have been proposed for applications such as data processing systems, image display devices or as isolation amplifiers. However, all of these devices have been of extremely low efficiency, on the order of a few percent, and their use has therefore been limited. One cause of this inefficiency has been the fact that previously known light sources emit light in substantially all directions and, upon passage out of the source into a surrounding medium having a different index of refraction from that of the emissive body, the emitted radiation has been greatly attenuated. A second cause of inefficiency is the high percentage of emitted radiation which is reflected and lost at interfaces betwen regions of differing refractive index, for example at the input face of the radiation detection means. It has not been possible to overcome this problem in previously known electro-optic devices. The present invention is directed to a new and improved electro-optic device which overcomes these difficulties.

Accordingly, it is an object of the present invention to provide a new and improved electro-optic device for producing an output optically coupled to and electrically isolated from an input.

Another object of the present invention is the provision of a highly efficient electro-optic device for converting an input signal to an electrically isolated output signal.

A further object of this invention is the provision of a high efficiency isolation amplifier.

Briefly in accord with one embodiment of my invention, I provide an electro-optic device comprising a substantially uni-directional source of radiation and a detector, sensitive to the radiation emitted by the source, juxtaposed therewith. The source and detector are separated by an electrically insulating material and an anti-reflective coating is provided at each interface between regions of differing optical refractive index. Means are provided for connecting an electrical input signal to the source and further means are provided for obtaining an electrical output signal from the detector. More particularly, the device of the present invention includes a radiation source comprising a semiconductive body adapted to emit electro-magnetic radiation in response to electrical signal, the body being located at the focal point of a solid parabolic reflector having a planar output surface. The optical refractive index of the reflector is selected to be substantially the same as that of the semiconductive body at the wavelength of the emitted radiation. Such a source is described and claimed in my co-pending application, now abandoned, Ser. No. 330,172, filed Dec. 12, 1963, and assigned to the assignee of the present invention.

The novel features believed characteristic of the invention are set forth in the appended claims. The invention itself, together with further objects and advantages thereof may best be understood by reference to the following description taken in connection with the appended drawings in which:

FIGURE 1 is a cross-sectional view of an electro-optic device constructed in accord with my invention; and FIGURE 2 is a schematic view illustrating a circuit incorporating the device of FIGURE 1.

As shown in FIGURE 1, the electro-optic device of the present invention, illustrated generally at 1, comprises a semiconductive source of electro-magnetic radiation 2, a detector 3 and an electrically insulating material 4 therebetween. Anti-reflective coatings 5 and 6 are provided at each interface between regions of differing optical refractive index between the source and the detector. Means for conducting an electrical stimulus to the radiation source comprise electrical conductors 7 and 8 and further means for obtaining an electrical output from the detector comprise electrical conductors 9 and 10.

More particularly, the radiation source 2 of the device 1 comprises the uni-directional source described and claimed in my aforementioned application, the disclosure of which is incorporated herein by reference. As described therein, the source 2 comprises a solid reflector 11 having a shape substantially similar to that of a right paraboloid and wherein the focal point of the curved surface 12 lies substantially in the planar surface 13. The term "solid" as used herein is intended to connote a body having appreciable thickness relative to its other dimensions and is not intended to exclude the possibility of using a liquid of suitable refractive index. The term "right paraboloid" as used herein is intended to indicate a solid closed body wherein an outer parabolically curved surface 12, intersects a substantially planar surface 13, at a substantially constant angle 14 along the line of intersection.

The radiation source 2 includes a semiconductive body 15 which is adapted to emit narrow band width electro-magnetic radiation in response to an electrical signal. The body 15 is disposed on the generally planar surface 13 and is placed substantially at the focal point of the curved surface 12. The body 15 is greatly enlarged in the illustration relative to the reflector for clarity of illustration; in general the body is approximately 1/100 of the size of the reflector. The body may be attached to the reflector 11 at interface 16 by means such as heating and fusing or bonding with a suitable adhesive having a refractive index substantially equal to the refractive index of the material of body 15. In the embodiment illustrated, the semiconductive body 15 is adapted to produce electromagnetic radiation by providing a p-n junction 17 therein by any of a plurality of means including controlled introduction of conductivity-determining impurities by diffusion or other processes. Alternatively, the reflector 11 may be of the same material as the body 15 and may then comprise an extension thereof or the body 15 may be epitaxially deposited on a suitable substrate which serves as reflector 11.

Input conductors 7 and 8, shown passing through the insulator, are attached to the semiconductive body 14 by means of contacts 18 and 19 which may comprise precious metal dots plated over portions of the respective p and n regions. The conductors 7 and 8 may comprise thin strips of evaporated metal deposited on an insulating layer. Alternatively, lead 7 may be attached to surface 12 of reflector 11, if the reflector is conductive. Preferably contact 19 covers the entire outer surface of body 15 so as to reflect radiation emitted in the direction of the detector back into the reflector 11 to collimate it with the rest of the emitted radiation.

The effect of placing the radiation source 15 at the focal point of the curved parabolic surface 12 is to cause radiation emitted from the source to pass through the reflector material to the curved surface 12 and be reflected therefrom to planar surface 13. A radiation reflecting coating 21 covers a portion of the curved surface 12 in the region where radiation from junction 17 is received at an angle of incidence less than the critical angle of reflection. The remainder of curved surface 12 is not coated in the illustration because radiation impinging thereupon is totally reflected without the benefit of a special coating. Reflective coating 21 is conveniently constituted of aluminum and, of course, coating 21 can cover the entire outer area of curved surface 12 without impairing the performance of reflector 11. For further description and alternative embodiments of such a light source, reference is made to my aforementioned copending application.

The material from which the reflector 11 is fabricated is selected to be transparent to and provide a refractive index which is substantially equal to the refractive index of semiconductive body 15 for the emitted radiation. Thus, radiation generated within the semiconductive body 15 is transmitted from the body to the curved surface of the reflector without transition through a region of differing refractive index and, therefore, without reflective loss. Substantially all of the radiation is reflected from the curved surface of the reflector toward the generally planar surface 13 where it strikes with an angle of incidence substantially equal to zero. Accordingly, substantially all of the radiation emitted by the junction is efficiently extracted from the light source.

In accord with the present invention, a planar detector 3 is juxtaposed with the planar surface 13 of the reflector so as to receive substantially all of the radiation emitted by semiconductive body 15 at zero incidence angle. As illustrated, the detector 3 may comprise a semiconductive body such as silicon having a photo-sensitive junction 22 between regions of opposing conductivity 23 and 24 therein. Other types of detectors, such as a photoconductor, may also be used. The detector 3 is electrically isolated from the light source 2 by electrically insulating material 4. The material 4 is selected to be transparent to the radiation emitted by the semiconductive junction 17, and may for example comprise a glass plate.

Ideally, the material 4 may be selected to have the same index of refraction as the reflector 11. However, in accord with this invention, the material 4 may have a different index without impairing the efficiency of the device. This is accomplished by providing an anti-reflective coating at each interface between materials of differing refractive indexes in the path of radiation from the planar surface 13 to the detector 3. In the embodiment illustrated in FIGURE 1, two anti-reflective coatings 5 and 6 are provided, one at the interface between the planar surface 13 and insulating material 4 and the other at the interface between insulating material 4 and detector 3. An anti-reflecting coating comprises a layer having a thickness equal to ¼ of the wavelength of the radiation to be transmitted and having an index of refraction equal to the square root of the relative index of refraction at the interface. The relative index of refraction is the quotient between the index in the material from which the radiation is emitted and the index in the material through which the radiation is transmitted. Multiple layers may also be used for further improvement. For further details concerning anti-reflecting coatings, reference is made to the text book "Optical Properties of Thin Solid Films" by Havens, in particular page 208 and following. The effect of such anti-reflecting coatings is to enhance transmission of uni-directional radiation across an interface between differing indexes by reducing reflection of radiation which impinges at an angle of incidence slightly greater than or equal to zero. If the insulating material 4 has the same index of refraction as the body 15 and reflector 11, the coating 5 may be omitted.

Devices according to the present invention enable the reception of very nearly 100% of the light generated in the semiconductive source by the detector. In previously known devices, the inefficiency of emission from the source and the fact that no means for reducing reflection at interfaces such as the surface of the detector have held the efficiency to such a low value, on the order of 1–5%, that the devices are of very limited utility. The present invention provides a device incorporating a uni-directional light source and efficient transmission through interfaces so as to have a greatly increased efficiency which may be as high as 95–100%. Essentially the only loss of generated radiation in such devices is that due to the transmission through the material.

FIGURE 2 illustrates a circuit in accord with the present invention which incorporates the device of FIGURE 1. In this circuit, which comprises a power amplifier having an electrically isolated input and output, a suitable source of bias voltage, illustrated as battery 25 and variable resistor 26, are connected across the light emitter 2 of electro-optic device 1. The electro-optic device 1 is shown schematically as a diode 2 and a planar detector 3 coupled by the light emission of the diode. Capacitor 27 provides an A.C. bypass for the battery 25 and resistor 26. A low voltage A.C. input is coupled through a transformer 28 having an input winding 29 and an output winding 30. Thus, the light transmission within the electro-optic device varies according to the A.C. input about the level established by the D.C. bias. The current through the diode is determined by the impedance of the input circuit and by the transformer 28. In the circuit illustrated, transformer 28 comprises a stepdown transformer having an intermediate impedance primary winding 29 and a low impedance secondary winding 30. Accordingly, the low voltage input develops a predetermined A.C. current through a low impedance circuit including the light emitter of device 1.

Within the electro-optic device 1, light emitter 2 produces light corresponding to the current flowing therethrough and, in turn, a corresponding current is produced modulating the D.C. current in detector 3. It is noted that the current in the detector is isolated from the current through the light emitter. The detector 3 is biased to an operating condition by battery 31 and variable resistor 32 while capacitor 33 serves as an A.C. bypass path. The A.C. component of the current in detector 3 is coupled out through a transformer 34 having a high impedance primary winding 35 and an intermediate impedance secondary winding 36. Thus, the emitter 2 and its circuit are of low impedance while the detector 3 and its circuit are of high impedance. Accordingly, due to the highly efficient current transfer within the device 1, the device functions as a power amplifier in that the modulating current in the detector, which depends on the current in the light emitter, is developed through the high detector impedance so that a power amplification is obtained. Therefore, the output taken from secondary winding 36 of transformer 34 is of a higher power than the input to primary winding 29 of transformer 28. It is noted that, in practice, other couplings than the transformers illustrated may be used but the device 1 still maintains electrical isolation of the output current from the input current and the input and output circuits may be at widely differing D.C. voltage levels.

By way of a particular example, suitable values for the components of the above described circuit may be as follows: Batteries 25 and 31 each supply 10 volts and resistors 26 and 32 are approximately 1000 ohms. Capacitors 27 and 33 are selected to provide a low A.C. impedance for the frequency at which it is desired to operate. Transformer 28 be provided with a turns ratio, primary to secondary, of 1–100. The impedance of the primary winding may be approximately 1000 ohms and the impedance of the secondary winding may be on the order of 0.1 ohm. Transformer 34 has a turns ratio, primary to secondary, of about 30–1 and the primary and secondary impedances are $10^6$ ohms and $10^3$ ohms, respectively.

In conjunction with such a circuit, the electro-optic device 1 may be constructed by providing a gallium arsenide light emitter having the shape of a right paraboloid and provided with a p-n junction at the focal point of the parabolic surface. Such a light emitter may be produced as described in my aforementioned co-pending application. A reflective coating of aluminum is then vapor deposited over the parabolic surface of the light emitter and an anti-reflecting coating of silicon monoxide is vapor deposited on the planar surface to a thickness equal to ¼ of the wavelength of the emitted radiation. Thin strips of metal are evaporated onto the anti-reflecting coating, which is an insulator, to form leads 7 and 8 and contacts 18 and 19 are formed by deposition through openings in the coating. A detector 3 may be provided by diffusing a P-type impurity such as boron into the planar surface of an N-type silicon block, the area of the P-type region corresponding approximately to the area of the light emitter 2. An anti-reflecting coating of silicon monoxide is then vapor deposited on the surface of the detector and a thin strip of evaporated metal forms conductor 9. The detector and light emitter are then disposed on opposite sides of a glass plate and pressed and bonded thereto. Conductor 10 comprises a wire connected by soldering to the detector 3. Other means known to the art of attaching the detector and emitter to the glass plate may also be used.

The combination of such a device with the circuit shown in FIGURE 2 and utilizing components having the parameters set forth above enables the amplification of a current input by a factor of 3000. Specifically, a current I in the primary of transformer 28 produces an A.C. current of 1000 I in the secondary, since both the secondary winding and the emitter 2 are of low impedance. Due to the high efficiency of the device 1, the A.C. modulating current in the detector circuit is essentially 100 I through the high impedance of the detector and of primary winding 35. Due to the turns ratio which reduces the impedance across transformer 34, the current is again amplified by a factor of about 30, producing an output current of 3000 I. This is accomplished because of the ability of the device 1 to couple a given current from a low impedance circuit to a high impedance circuit.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A high efficiency electro-optic device for producing an electrical output signal dependent upon and electrically isolated from an input signal comprising: a substantially uni-directional semiconductive light source including a reflector of substantially right parabolic shape, the planar surface of said reflector intersecting the focal point thereof, and a semiconductive body adapted to emit electromagnetic radiation in response to an electrical input signal, said body being located substantially at said focal point, said reflector being comprised of material different from the semiconductive material of said body but having an optical refractive index substantially equal to the optical refractive index of said body; a detector sensitive to the electro-magnetic radiation emitted by said body, said detector having a planar input surface juxtaposed with and insulated electrically from the planar surface of said reflector; and an anti-reflecting coating disposed at each interface between materials of differing refractive index in the path of said radiation from said reflector to said detector.

2. The high efficiency electro-optic device of claim 1 wherein said planar input surface of said detector and said planar output surface of said reflector are disposed in parallel spaced relation, and a layer of electrically insulating material is included between said reflector and said detector.

3. The high efficiency electro-optic device claimed in claim 2 wherein the optical refractive index of said electrically insulating material is substantially equal to that of said reflector, and said anti-reflecting coating is disposed at the interface between said insulating material and said detector.

4. The high efficiency electro-optic device claimed in claim 2 wherein a first anti-reflecting coating is provided at the interface between said electrically insulating material and said reflector and a second anti-reflecting coating is provided at the interface between said electrically insulating material and said detector.

5. The high efficiency electro-optic device claimed in claim 1 wherein said semiconductive body includes a junction between regions of opposing conductivity type, said junction being adapted to emit electro-magnetic radiation upon the application of a sufficient potential difference thereacross.

6. The high efficiency electro-optic device claimed in in claim 1 wherein said detector comprises a body of a material selected from the group consisting of silicon and germanium, said body including a junction between regions of opposing conductivity type which is adapted to respond to radiation of the wavelength emitted by said semiconductive body.

7. The high efficiency electro-optic device claimed in claim 1 wherein said semiconductive body comprises gallium arsenide and includes a junction between regions of opposing conductivity type therein, said device further including a layer of electrically insulating material interposed between said source and said detector.

8. Circuit means for amplifying a low input current comprising: an electro-optic device including a low impedance current-activated semiconductive radiation emitting body, a reflector of substantially right parabolic shape, said body being located substantially at the focal point of said reflector, said reflector being comprised of material different from the semiconductive material of said body but having an optical refractive index substantially equal to that of said body, a high impedance radiation detector juxtaposed with said reflector to receive radiation from said reflector, and an anti-reflective coating disposed at each interface between materials of differing refractive index in the path of said radiation from said reflector to said detector; low impedance circuit means including said body; means for biasing said body to an operating condition; means for coupling an input current through said low impedance circuit to said body; high impedance circuit means including said detector; means for biasing said detector to an operating condition; and means for coupling the current in said detector through said high impedance circuit to an output circuit.

9. A directional source of electromagnetic radiation comprising: a body of predetermined semiconductive material adapted to produce electromagnetic radiation in at least one predetermined direction in response to electrical excitation and having a predetermined optical refractive index; a solid body of substantially a right paraboloid having the planar surface thereof intersecting the focal point of the curved surface thereof; said body of predetermined semiconductive material having a small radiation emissive area in relation to the area of said planar surface and being affixed to said planar surface substantially at said focal point so as to direct substantially all of said electromagnetic radiation toward said curved surface, said paraboloid being comprised of material different from said predetermined semiconductive material but transparent to said radiation and having an optical refractive index substantially equal to the predetermined optical refractive index of said semiconductive material; and means coupled to said body of predetermined semiconductive material for providing electrical excitation thereof.

10. The directional source of electromagnetic radiation of claim 10 including a coating reflective to said elec- comprises another semiconductive material.

11. The directional source of electromagnetic radiation of claim 10 including a coating reflective to said electromagnetic radiation disposed over the outside of at least the central region of said curved surface so as to reflect substantially all of said electromagnetic radiation emerging from said curved surface.

12. The directional source of electromagnetic radiation of claim 10 including an anti-reflecting coating disposed over said planar surface.

13. The directional source of electromagnetic radiation of claim 11 including an anti-reflecting coating disposed over said planar surface.

References Cited

UNITED STATES PATENTS

| | | | |
|---|---|---|---|
| 3,302,051 | 1/1967 | Galginaitis | 250—217 |
| 3,371,213 | 2/1968 | Adams et al. | 250—211 |

RALPH G. NILSON, Primary Examiner

M. ABRAMSON, Assistant Examiner

U.S. Cl. X.R.

250—217; 317—235

PO-1050
(5/69)

UNITED STATES PATENT OFFICE
CERTIFICATE OF CORRECTION

Patent No. 3,462,605          Dated _____

Inventor(s) William E. Engeler

It is certified that error appears in the above-identified patent and that said Letters Patent are hereby corrected as shown below:

Column 7, line 12, after "claim", delete "10 including a coating reflective to said elect" - and substitute therefor -- 9 wherein the material of said paraboloid --

SIGNED AND
SEALED

DEC 9 - 1969

(SEAL)
Attest:

Edward M. Fletcher, Jr.
Attesting Officer

WILLIAM E. SCHUYLER, JR.
Commissioner of Patents